M. J. LECLERC & W. SCHMITT.
REAR END BUFFER FOR AUTOMOBILES.
APPLICATION FILED SEPT. 14, 1910.
1,034,125.
Patented July 30, 1912.
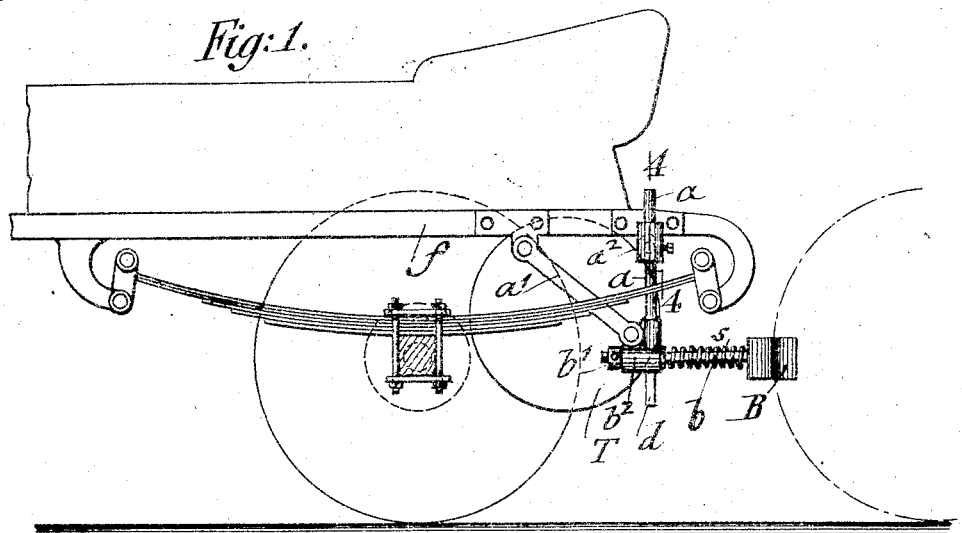
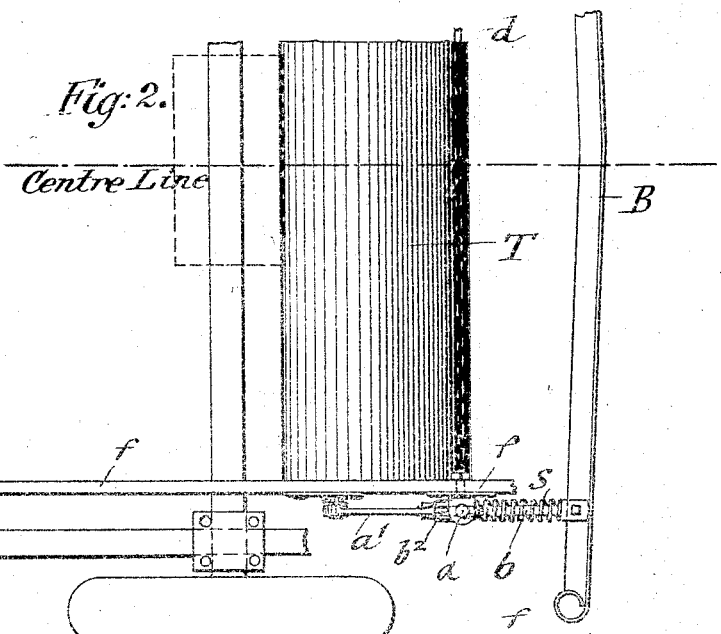
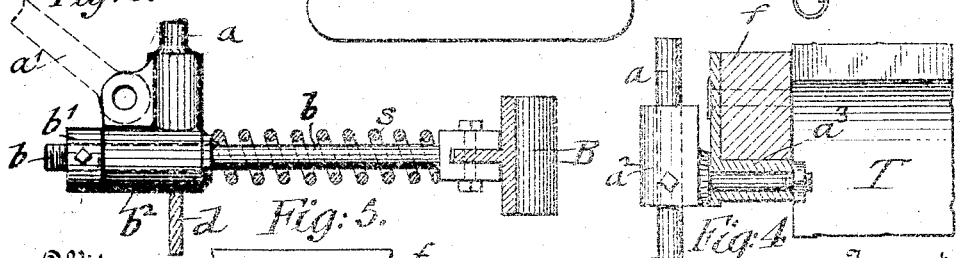

UNITED STATES PATENT OFFICE.

MOÏSE J. LECLERC AND WILLIAM SCHMITT, OF NEW YORK, N. Y., ASSIGNORS TO SAID LECLERC AND FREDERICK W. DARNSTAEDT, OF NEW YORK, N. Y.

REAR-END BUFFER FOR AUTOMOBILES.

1,034,125.  Specification of Letters Patent.  Patented July 30, 1912.

Application filed September 14, 1910. Serial No. 582,016.

*To all whom it may concern:*

Be it known that we, MOÏSE J. LECLERC and WILLIAM SCHMITT, both citizens of the United States of America, the former a resident of the city of New York, borough of Manhattan, and the latter a resident of the city of New York, borough of Queens, in the counties of New York and Queens, State of New York, respectively, have invented certain new and useful Improvements in Rear-End Buffers for Automobiles, of which the following is a specification.

This invention relates to an improved device, the object of which is to protect the rear-ends of automobiles or other vehicles and any parts, or accessories attached thereto, against injury from collision with another automobile or other vehicle, or with any stationary object when the automobile or other vehicle is moving backward, and more particularly to protect the gasolene-tank, when the same is attached to the rear-end of the vehicle, and to lessen the damage to a colliding vehicle; and for this purpose the invention consists, primarily, of a buffer extending transversely across the rear-end of the automobile or other vehicle, means for supporting it thereon, means for adjusting the same, either vertically or horizontally, and means for absorbing the shock of the collision.

The invention consists further in certain details of construction which will be more fully described hereinafter and finally pointed out in the claims.

In the accompanying drawings, Figure 1 represents a side elevation of our rear-end buffer for automobiles, showing the support for the frame or chassis; Fig. 2 is a plan view of one-half of Fig. 1; Fig. 3 is a detail, sectional elevation of the rear-end buffer and its support; Fig. 4 is a detail rear-elevation, partly in section on line 4, 4, Fig. 1, of the connection of the hanger-rod with the frame or chassis; Fig. 5 shows a detail side-view of a modified construction of the rear-end buffer.

Similar reference characters indicate corresponding parts throughout the several figures.

Referring to the drawings, B represents a rear-end buffer for automobiles or other vehicles. The buffer B is made of T-shaped cross-section and extends transversely to the full width of the automobile, so as to protect not only the gasolene-tank T, when the same is supported at the rear-end of the automobile, but also the pneumatic tires of the rear-wheels against injury in case of a rear-end collision. In place of making the buffer of T-shaped cross-section, it can also be made of round or angular cross-section or be combined with a roller for preventing the wheels of an approaching automobile from mounting the buffer and injuring the same and the rear-end of the vehicle. The buffer B is supported by two hanger-rods $a$ $a'$ which are attached at their upper ends to the frame or chassis $f$ of the automobile, either in a stationary position or by means of a pivoted connection comprising a sleeve-shaped socket $a^2$ which turns by a laterally-extending pivot $a^3$ in a sleeve at the underside of the frame $f$. The buffer B is connected near both ends by horizontal rods $b$ with the lower ends of the brackets $a$ and is attached thereto by means of nuts $b'$, screwed over the rear-ends of the horizontal supporting rods $b$, each of the rods $b$ passing through a cylindrical sleeve $b^2$ at the lower end of the bracket $a$. A cross-bar or rod $d$ extends transversely from the lower end of one bracket $a$ to the other, so as to stiffen the same. By means of the horizontal bars $b$, the rear-end buffer may be adjusted to some extent so as to be set closer to or farther away from the rear-end of the automobile. This is accomplished by the threaded rear-ends of the horizontal rods $b$ and the screw-nuts $b'$ which are screwed over the same against the sleeve $b^2$ at the lower ends of the vertical rods $a$ as shown clearly in Fig. 3. In order to permit the rear-end buffer B to be extended in a vertical direction, the lower part of the brackets $a$ are connected by inclined pivot links $a'$ with the frame $f$; and the vertical rods $a$ of the hanger brackets are adjustably secured in the sleeve-shaped socket $a^2$, which is connected by the laterally extended pivot $a^3$ to the frame $f$, as shown in Fig. 4. The upper end of the hanger-rod $a$ is readily clamped in the sleeve-shaped sockets $a^2$ and thereby the bracket-hanger as well as the rear-end buffer is held firmly in position, but may be raised or lowered on unscrewing the said screw of the sleeve $a^2$.

Between the sleeves $b^2$ at the lower end of the hanger-rod $a$ and the forward end of the horizontal rods $b$, are interposed strong helical springs s, which serve for the purpose of cushioning the buffer against shocks and concussions, so that any danger of breaking the supporting brackets or the buffer is obviated. In place of cushioning springs, any other means for cushioning the buffer B and absorbing the shock of the concussion, may be employed, such as pneumatic or hydraulic means, so that the same protecting effect is obtained. The brackets may also be attached rigidly to the frame, in which case the adjustment of the buffer is dispensed with. The buffer can also be attached to the frame by horizontal supporting-arms only, as shown in Fig. 5. The device can also be attached to the rear-axle as the principal support and be held in position by attachment to the rear spring hangers. The rear-end buffer B is curved somewhat from the center toward the ends, and serves as a reliable protection for the automobile against rear-end collision with another automobile or vehicle, but it is mainly intended to protect the gasolene-tank when the same is supported at the rear-end of the automobile, and incidentally, the pneumatic tires of the rear-wheels against injury.

Having thus described our invention, we claim as new and desire to secure by Letters Patent:

1. The combination, with the frame of an automobile or other vehicle, of hanger-rods, supported on said frame, brace-links connecting the lower ends of the hanger-rods with the frame, guide-sleeves at the lower ends of the hanger-rods, a transverse buffer-bar, buffer-rods connecting said buffer-bar with the sleeves, cushioning springs interposed between the guide-sleeves and buffer-bar, and stop-collars at the front ends of the buffer-rods for limiting the movement of the buffer-rods.

2. The combination, with the frame of an automobile or other vehicle, of hanger-rods, means for pivotally suspending them at their upper ends from said frame, pivoted brace-links connecting the lower ends of the hanger-rods with the frame, guide-sleeves at the lower ends of the hanger-rods, a transverse buffer-bar extending across the rear-end of the frame, buffer-rods, connecting the buffer-bar with the guide-sleeves, cushioning springs, interposed between the buffer-bar and the guide-sleeves, and stop-collars at the front ends of the buffer-rods for limiting the movement of the buffer-rods.

3. The combination, with the frame of an automobile or other vehicle, of hanger-rods, means for pivotally suspending them from said frame, means for vertically-adjusting them thereon, pivoted brace-links connecting the lower ends of the hanger-rods with the frame, guide-sleeves at the lower ends of the hanger-rods, a transverse buffer-bar extending across the rear-end of the frame, a transverse stiffening bar between the hanger-rods, horizontal buffer-rods connecting the buffer-bar with the guide-sleeves, cushioning springs for said buffer-rods, and stop-collars at the front ends of the buffer-rods for limiting the movements of the buffer rods.

4. The combination with the frame of an automobile or other vehicle, of sleeve-shaped sockets having laterally-extending pivots applied to said frame, vertical hanger-rods fitted in said sleeve-shaped sockets, inclined links pivoted to the frame and to the lower ends of the hanger-rods, guide-sleeves at the lower ends of the hanger-rods, horizontal bars extending through said guide-sleeves, stop-collars on the front-ends of said horizontal bars and bearing against said sleeves, forked heads at the rear-ends of said horizontal bars, cushioning springs interposed on said horizontal bars between said heads and horizontal sleeves, and a T-shaped buffer-bar pivoted to the forked rear-ends of said horizontal bars.

5. An automobile buffer, comprising, in combination, a buffer-bar having an inwardly extending central web, a pair of buffer-bar-carrying arms secured to said web, guiding and supporting devices rigidly secured to the frame of the vehicle and in which said arms are slidably mounted, and cushioning springs opposing the inward movement of said arms, substantially as described.

In testimony, that we claim the foregoing as our invention, we have signed our names in presence of two subscribing witnesses.

MOÏSE J. LECLERC.
WILLIAM SCHMITT.

Witnesses:
PAUL GOEPEL,
JOHN MURTAGH.